US012775063B2

(12) United States Patent
Wang et al.

(10) Patent No.: US 12,775,063 B2
(45) Date of Patent: Oct. 27, 2026

(54) TWO-ANTENNA DUAL-MODE POWER TRANSMITTER

(71) Applicant: KaikuTek Inc., Taipei City (TW)

(72) Inventors: Mike Chun-Hung Wang, Taipei City (TW); Yi-Chu Chen, Taipei City (TW); Kun-You Lin, Taipei City (TW); Zi-Hao Fu, Taipei City (TW); Hsiang-Chieh Jhan, Taipei City (TW)

(73) Assignee: KaiKuTek Inc., Taipei City (TW)

( * ) Notice: Subject to any disclaimer, the term of this patent is extended or adjusted under 35 U.S.C. 154(b) by 158 days.

(21) Appl. No.: 19/018,841

(22) Filed: Jan. 13, 2025

(65) Prior Publication Data

US 2026/0202505 A1 Jul. 16, 2026

(51) Int. Cl.
*G01S 7/03* (2006.01)

(52) U.S. Cl.
CPC .................................... *G01S 7/03* (2013.01)

(58) Field of Classification Search
CPC .................................................. G01S 7/03
See application file for complete search history.

(56) References Cited

U.S. PATENT DOCUMENTS

2008/0058019 A1* 3/2008 Natarajan ................ H01Q 3/42 455/562.1
2009/0195317 A1* 8/2009 Zhang ................... H03F 1/0277 330/295
2013/0033118 A1* 2/2013 Karalis ................. B60L 53/126 307/104
2014/0361628 A1* 12/2014 Huang .................... H01F 38/14 307/104
2018/0097405 A1* 4/2018 Costinett ................. H02J 50/12
2022/0158343 A1 5/2022 Hassan et al.

FOREIGN PATENT DOCUMENTS

TW 202239157 A 10/2022
TW 202316790 A 4/2023

* cited by examiner

*Primary Examiner* — Vladimir Magloire
*Assistant Examiner* — Hailey R Le
(74) *Attorney, Agent, or Firm* — RABIN & BERDO, P.C.

(57) ABSTRACT

A two-antenna dual-mode power transmitter comprises a first binary phase-shift amplifier and a first power amplifier electrically connected thereto, a second binary phase-shift amplifier and a second power amplifier electrically connected thereto. The first power amplifier is connected to a third coupling inductor, the second power amplifier is connected to a sixth coupling inductor, the third coupling inductor is connected to an output of a first switch, and the sixth coupling inductor is connected to an output of a second switch; another output of the third coupling inductor, another output of the sixth coupling inductor, and an output of the third switch are connected; operations of the binary phase shifter amplifier comprises a zero operation mode, a PI-phase operation mode, the operation of the two-antenna dual-mode power transmitter comprises a first single antenna TDM mode, a second single antenna TDM mode, a first two-antenna BPM mode, and a second two-antenna BPM mode.

15 Claims, 17 Drawing Sheets

TWO-ANTENNA DUAL-MODE POWER TRANSMITTER

BACKGROUND OF THE INVENTION

1. Field of the Invention

The present invention relates to a transmitter, in particular to a two-antenna dual-mode power transmitter.

2. Description of the Related Art

Radar technology has been widely recognized for its performance in detecting objects, especially in short-range sensing and distance measurement applications. Radar with multiple-input multiple-output (MIMO) antenna architecture can significantly improve the angular resolution required for radar with minimal hardware to recognize isolated objects, and therefore said MIMO antenna architecture can be used in a variety of applications. Therefore, radars with MIMO antenna architecture have become popular recently. Furthermore, time division multiplexing (TDM) and binary phase modulation (BPM) techniques have been widely used in the implementation of MIMO radar. Depending on the specific application scenario, TDM and BPM techniques have different advantages and disadvantages.

FIG. 16 shows a conventional two-antenna time division multiplexing (2T-TDM) transmitter 80 used in a MIMO system application, wherein a conventional two-antenna time division multiplexing transmitter 80 has two independent power amplifier cascade chains 81, 82, wherein said independent power amplifier cascade chains 81, 82 each include a signal source LOG_TX1/LOG_TX2, a driver power amplifier DPA1/DPA2, and a power amplifier PA1/PA2 coupled by individual inductive coils. The independent power amplifier cascade chains 81, 82 each further include a first/second antenna TX1/TX2, and a first/second gate bias ON/OFF circuit. The first/second gate bias ON/OFF circuits are each connected to and control both the driver power amplifier DPA1/DPA2 and the power amplifier PA1/PA2. Therefore, the conventional two-antenna time-sharing multiplexer 80 can operate two independent power amplifier series chains 81, 82 and drive two independent first/second antennas TX1/TX2 at the same time, and the two independent power amplifier series chains 81, 82 have multi-stage amplifiers, which results in the power consumption and circuit complexity of the conventional two-antenna time-sharing multiplexer 80. The conventional two-antenna time-sharing multiplexer 80 has the disadvantages of increased power consumption and circuit complexity.

FIG. 17 shows another conventional two-antenna binary phase modulation (2T-BPM) transmitter 90 used in MIMO system applications with two independent power amplifier series chains 91, 92. Compared to the conventional two-antenna time division multiplexer 80, the conventional two-antenna binary phase modulation transmitter 90 adds a first/second binary phase shifter before each of the driver power amplifiers (DPA1/DPA2) so that an input signal is binary phase modulated before it is amplified by the amplifier. While this approach increases phase diversity, it also maintains two separate power amplifier series chains 91, 92 with the same drawbacks of increased power consumption and circuit complexity.

Therefore, how to improve the transmitter architecture of the current MIMO radar based on the conventional two-antenna time division multiplexing (2T-TDM) transmitter and the conventional two-antenna binary phase modulation (2T-BPM) transmitter to reduce the power consumption and the circuit complexity is a problem to be solved in this field.

SUMMARY OF THE INVENTION

In view of the above-mentioned issues, the present invention provides a two-antenna dual-mode power transmitter comprising:

a first binary phase-shift amplifier having an input terminal pair and an output terminal pair;

a first power amplifier having an input terminal pair and an output terminal pair, the output terminal pair of the first binary phase-shift amplifier being electrically connected to the input terminal pair of the first power amplifier;

a second binary phase-shift amplifier having an input terminal pair and an output terminal pair;

a second power amplifier having an input terminal pair and an output terminal pair, the output terminal pair of the second binary phase-shift amplifier being electrically connected to the input terminal pair of the second power amplifier;

an output matching network comprising a third coupling inductor, a sixth coupling inductor, a first switch, a second switch, and a third switch, and the third coupling inductor and the sixth coupling inductor each comprising an input terminal pair, a first output terminal, and a second output terminal, and the first switch, the second switch, and the third switch each comprising a ground terminal, a control terminal, and an output terminal, and the output terminal pair of the first power amplifier connected to the input terminal pair of the third coupling inductor, the output terminal pair of the second power amplifier connected to the input terminal pair of the sixth coupling inductor, the first output terminal of the third coupling inductor connected to the output terminal of the first switch, the second output terminal of the sixth coupling inductor connected to the output terminal of the second switch, and the three of the second output terminal of the third coupling inductor, the first output terminal of the sixth coupling inductor, and the output terminal of the third switch connected together;

wherein circuit structures of the first binary phase-shift amplifier and the second binary phase-shift amplifier are the same, and circuit structures of the first power amplifier and the second power amplifier are the same.

In one embodiment, the output terminal of the first switch is connected to a first antenna, and the output terminal of the second switch is connected to a second antenna.

In one embodiment, the first binary phase-shift amplifier comprises:

a third transistor, a fourth transistor, a fifth transistor, and a sixth transistor, with the third to sixth transistors each having a source, a gate, and a drain;

a third coupling capacitor, a fourth coupling capacitor, a fifth coupling capacitor, a sixth coupling capacitor, and the third to sixth coupling capacitors each having two ends;

the input terminal pair of the first binary phase-shift amplifier comprising a first input terminal and a second input terminal, and the output terminal pair of the first binary phase-shift amplifier comprising a first output terminal and a second output terminal;

wherein the sources of the third to the sixth transistors are grounded, the drains of the third transistor and the fifth transistor are connected to the first output terminal, the drains of the fourth transistor and the sixth transistor are connected to the second output terminal; the gate of the third transistor is connected to a zero-phase DC bias voltage via a third resistor, and the gate of the third transistor is also connected to the first input terminal via a third coupling capacitor, and the gate of the fourth transistor is connected to a PI-phase DC bias voltage via a fourth resistor, and the gate of the fourth transistor is also connected to the first input terminal via a fourth coupling capacitor; the gate of the fifth transistor is connected to the PI-phase DC bias voltage via a fifth resistor, and the gate of the fifth transistor is also connected to the second input terminal via a fifth coupling capacitor, and the gate of the sixth transistor is connected to the zero-phase DC bias voltage via a sixth resistor, and the gate of the sixth transistor is also connected to the second input terminal via a sixth coupling capacitor.

In one embodiment, the first power amplifier comprises:

a first transistor and a second transistor, and the first to second transistors each having a source, a gate, and a drain;

a first coupling capacitor and a second coupling capacitor, and the first to second coupling capacitors each having two ends;

the input terminal pair of the first power amplifier comprises a third input terminal and a fourth input terminal, and the output terminal pair of the first power amplifier comprising a third output terminal and a fourth output terminal;

wherein the sources of the first transistor and the second transistor are grounded, the first coupling capacitor is connected between the gate of the first transistor and the drain of the second transistor, and the second coupling capacitor is connected between the gate of the second transistor and the drain of the first transistor, and the gate of the first transistor is connected to the third input terminal, the gate of the second transistor is connected to the fourth input terminal, the drain of the first transistor is connected to the third output terminal, and the drain of the second transistor is connected to the fourth output terminal.

In one embodiment, operation of the first binary phase-shift amplifier includes a zero-phase operation mode, the zero-phase operation mode implying that the PI-phase DC bias voltage of the first binary phase-shift amplifier is set to ground to turn off the fourth transistor and the fifth transistor of the first binary phase-shift amplifier, and the zero-phase DC bias voltage is set as a conductive operation bias voltage to operate the third transistor and the sixth transistor in a conductive operation state to transmit a first differential input signal from the input terminal pair of the first binary phase-shift amplifier to the output terminal pair of the first binary phase-shift amplifier via the first binary phase-shift amplifier.

In one embodiment, operation of the first binary phase-shift amplifier includes a PI-phase operation mode, the PI-phase operation mode implying that a zero-phase DC bias voltage of the first binary phase-shift amplifier is set to ground to turn off the third transistor and the sixth transistor of the first binary phase-shift amplifier, and the PI-phase DC bias voltage is set as a conductive operation bias voltage to operate the fourth transistor and the fifth transistor in a conductive operation state to transmit a first differential input signal from the input terminal pair of the first binary phase-shift amplifier to the output terminal pair of the first binary phase-shift amplifier via the first binary phase-shift amplifier.

In one embodiment, operations of the first binary phase-shift amplifier includes a zero-phase operation mode and a PI-phase operation mode, and when the first binary phase-shift amplifier receives the same differential input signal in both the zero-phase operation mode and the PI-phase operation mode, there is a 180-degree phase difference between the differential output signal of the first binary phase-shift amplifier in the zero-phase operation mode and the differential output signal of the first binary phase-shift amplifier in the PI-phase operation mode.

In one embodiment, operation of the two-antenna dual-mode power transmitter includes a first single antenna TDM mode, in which the first binary phase-shift amplifier and the second binary phase-shift amplifier are both set to a zero-phase operation mode, in which the first switch and the third switch are controlled to be off, and the second switch is controlled to be on, so that the output terminal of the second switch is grounded through the second switch being on.

In one embodiment, operation of the two-antenna dual-mode power transmitter includes a second single antenna TDM mode, in which the first binary phase-shift amplifier and the second binary phase-shift amplifier are both set as a zero-phase operation mode, in which the second switch and the third switch are controlled to be off, and the first switch is controlled to be on, so that the output terminal of the first switch is grounded through the first switch being on.

In one embodiment, operation of the two-antenna dual-mode power transmitter includes a first two-antenna BPM mode, in which the first binary phase-shift amplifier and the second binary phase-shift amplifier are both set as a zero-phase operation mode, in which the first switch and the second switch are controlled to be off, and the third switch is controlled to be on, so that the output of the third switch is grounded through the third switch being on.

In one embodiment, operation of the two-antenna dual-mode power transmitter includes a second two-antenna BPM mode, in which the first binary phase-shift amplifier and the second binary phase-shift amplifier are both set as a PI-phase operation mode, in which the first switch and the second switch are controlled to be off, and the third switch is controlled to be on, so that the output of the third switch is grounded through the third switch being on.

The present invention provides a two-antenna dual-mode power transmitter, in which two sets of series-connected amplifiers receive the same input signal, and then the two sets of series-connected amplifiers together drive two antennas via an output matching network. The two-antenna dual-mode power transmitter of the present invention can switch among four modes of operation, namely the first single-antenna TDM mode, the second single-antenna TDM mode, the first two-antenna BPM mode, and the second two-antenna BPM mode, solely by controlling some control voltages. Therefore, the two-antenna dual-mode power transmitter of the present invention can simplify the circuit complexity and reduce the cost of transmitter structure for the multiple-input multiple-output radar, and at the same time, the cost and the power consumption of said transmitter structure for the MIMO radar can also be reduced. Thus, the purpose of the present invention can be achieved.

In order to make the above objects, features and advantages of the present invention more apparent and easier to understand, the following embodiments, together with the accompanying drawings, are described in detail as follows.

DETAILED DESCRIPTION OF THE INVENTION

The technical contents, features and effects of the present invention will be clearly presented in the following detailed description of the preferred embodiment with reference to the drawings. In addition, the directional terms mentioned in the following embodiments, such as: up, down, left, right, front, back, bottom, top, etc., are only relative directions with reference to the drawings, and do not represent absolute directional positions; therefore, the directional terms used are for the convenience of illustrating their relative positional relationships, and are not intended to impose limitations on the present invention.

Figure 1:
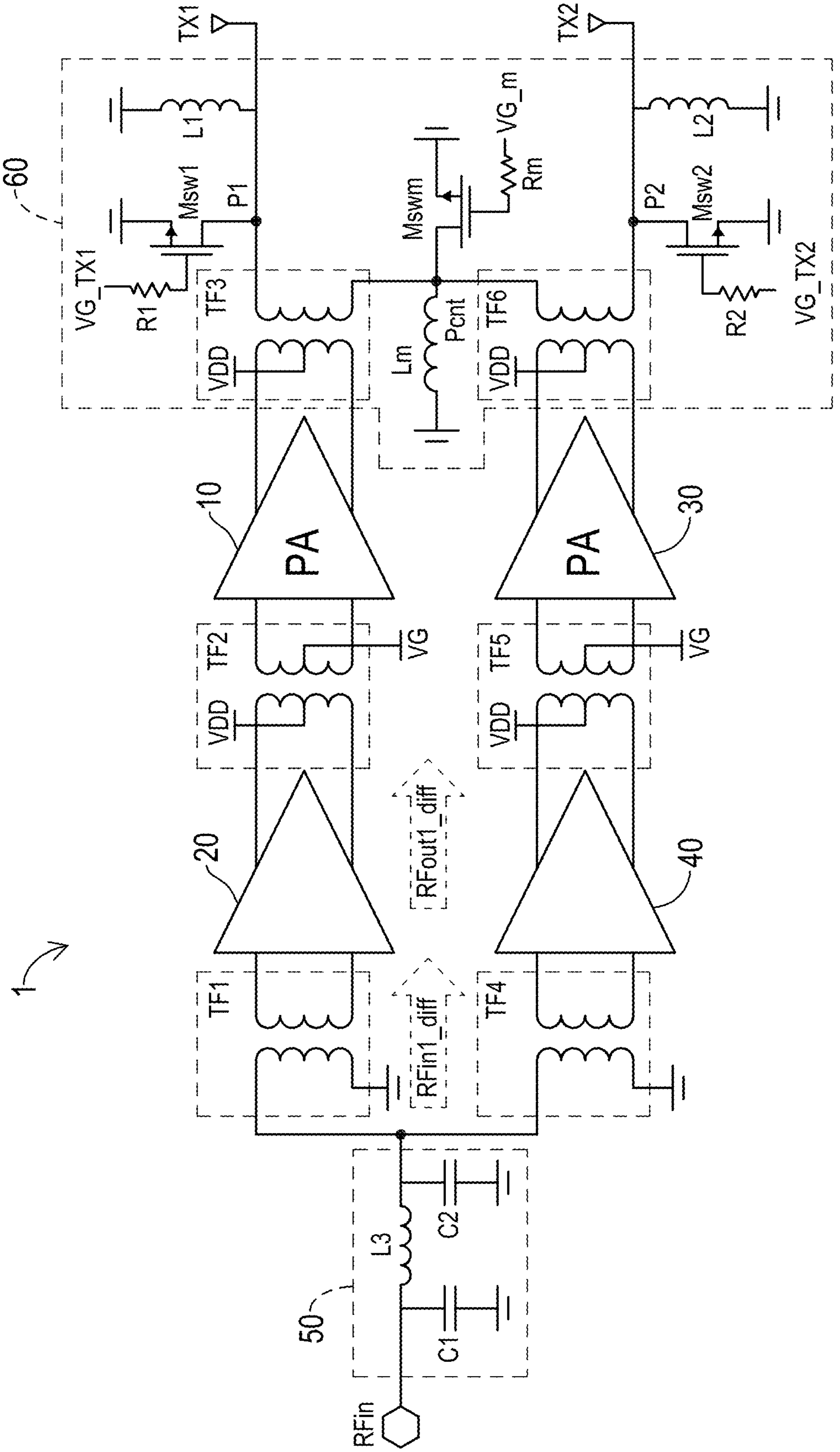
FIG. 1 illustrates the schematic diagram of the circuit of the two-antenna dual-mode power transmitter of the present invention.

Referring to FIG. 1, FIG. 1 illustrates the circuitry of a two-antenna dual-mode power transmitter 1 of the present invention for use in a multiple-input multiple-output (MIMO) antenna system. The two-antenna dual-mode power transmitter 1 of the present invention comprises a first power amplifier 10, a second power amplifier 30, a first binary phase-shift amplifier 20, a second binary phase-shift amplifier 40, a low-pass filter 50, an output matching network (OMN) 60, and a plurality of coupled inductors. The two-antenna dual-mode power transmitter 1 of the present invention drives a first antenna TX1 and a second antenna TX2 based on an input signal provided by an input signal source RFin. The circuits of the first power amplifier 10 and the second power amplifier 30 are the same. The circuits of the first binary phase-shift amplifier 20 and the second binary phase-shift amplifier 40 are the same.

The low-pass filter 50 comprises an input terminal connected to the input signal source RFin, and an output terminal connected to a first input terminal of an input terminal pair of the first coupling inductor TF1. An output terminal pair of the first coupling inductor TF1 is connected to an input terminal pair of the first binary phase-shift amplifier 20. An output terminal pair of the first binary phase-shift amplifier 20 is connected to an input terminal pair of a second coupling inductor TF2. An output terminal pair of the second coupling inductor TF2 is connected to an input terminal pair of the first power amplifier 10. An output terminal pair of the first power amplifier 10 is connected to an input terminal pair of a third coupling inductor TF3 of the output matching network 60, wherein a second input terminal of the input terminal pair of the first coupling inductor TF1 is grounded, and a center tap of an input coil of the second coupling inductor TF2 is connected to a DC high voltage level (VDD), a center tap of an output coil of the second coupling inductor TF2 is connected to a DC low voltage level (VG), and a center tap of an input coil of the third coupling inductor TF3 is connected to the DC high voltage level (VDD).

The output terminal of the low-pass filter 50 is further connected to a first input terminal of an input terminal pair of a fourth coupling inductor TF4. An output terminal pair of the fourth coupling inductor TF4 is connected to an input terminal pair of the first binary phase-shift amplifier 20. An output terminal pair of the first binary phase-shift amplifier 20 is connected to an input terminal pair of a fifth coupling inductor TF5. An output terminal pair of the fifth coupling inductor TF5 is connected to an input terminal pair of the first power amplifier 10. An output terminal pair of the first power amplifier 10 is connected to an input terminal pair of a sixth coupling inductor TF6 of the output matching network 60, wherein a second input terminal of the input terminal pair of the fourth coupling inductor TF4 is grounded, and a center tap of an input coil of the fifth coupling inductor TF5 is connected to a DC high voltage level (VDD), a center tap of an output coil of the fifth coupling inductor TF5 is connected to a DC low voltage level (VG), and a center tap of an input coil of the sixth coupling inductor TF6 is connected to the DC high voltage level (VDD). The circuits of the first coupling inductor TF1 and the fourth coupling inductor TF4 are the same. The circuits of the second coupling inductor TF2 and the fifth coupling inductor TF5 are the same. The circuits of the third coupling inductor TF3 and the sixth coupling inductor TF6 are the same.

In the output matching network 60, a first output terminal P1 of an output terminal pair of the third coupling inductor TF3 is connected to the first antenna TX1, one end of the first inductor L1, and a drain of a first switching transistor Msw1; a second output terminal P2 of an output terminal pair of the sixth coupling inductor TF6 is connected to the second antenna TX2, one end of the second inductor L2, and a drain of a second switching transistor Msw2; a second output terminal of the third coupling inductor TF3, a first output terminal of the sixth coupling inductor TF6, one end of a compensation inductor Lm, and a drain of a third switching transistor Mswm are connected at a center terminal Pcnt. Wherein the other end of the first inductor L1 is grounded, a source of the first switching transistor Msw1 is grounded, and a gate of the first switching transistor Msw1 is connected to a first antenna switching voltage VG_TX1 via a first resistor R1; the other end of the second inductor L2 is grounded, a source of the second switching transistor Msw2 is grounded, and a gate of the second switching transistor Msw2 is connected to a second antenna switching voltage VG_TX2 via a second resistor R2; the other end of the compensation inductor Lm is grounded; a source of the third switching transistor Mswm is grounded, and a gate of the third switching transistor Mswm is connected to a compensation switching voltage VG_m via a compensation resistor Rm.

In one embodiment, the first switching transistor Msw1, the second switching transistor Msw2, the third switching transistor Mswm all can be N-type field-effect transistors, such as N-type Metal-Oxide-Semiconductor field effect transistors (N-type MOSFET).

In one embodiment, the low-pass filter 50 comprises a first capacitor C1, a second capacitor C2, and a third inductor L3, wherein the input end of the low-pass filter 50 is connected to one end of the third inductor L3 and one end of the first capacitor C1, and the output end of the low-pass filter 50 is connected to the other end of the third inductor L3 and the one end of the second capacitor C2; the other end of the first capacitor C1 and the other end of the second capacitor C2 are grounded.

Figure 2:
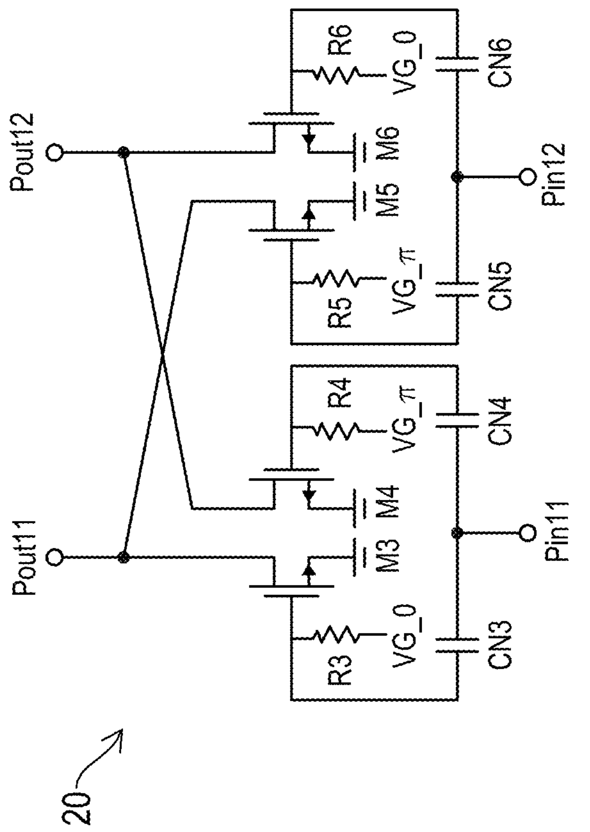
FIG. 2 illustrates the schematic diagram of the circuit of the first binary phase-shift amplifier of the present invention.

Referring to FIG. 2, FIG. 2 illustrates the circuit structure of the first binary phase-shift amplifier 20 of the present invention. The first binary phase-shift amplifier 20 comprises an input terminal pair including a first input terminal Pin11, a second input terminal Pin12, and an output terminal pair including a first output terminal Pout11 and a second output terminal Pout12; the first binary phase-shift amplifier 20 further comprises an input transistor group consisting of a third transistor M3, a fourth transistor M4, a fifth transistor M5, and a sixth transistor M6, wherein sources of the third to sixth transistors M3-M6 are grounded, drains of the third transistor M3 and the fifth transistor M5 are connected to the first output terminal Pout11, and drains of the fourth transistor M4 and the sixth transistor M6 are connected to the second output terminal Pout12; a gate of the third transistor M3 is connected to a zero-phase DC bias voltage VG_0 via a third resistor R3, and the gate of the third transistor M3 is also connected to the first input terminal Pint1 via a third coupling capacitor CN3; a gate of the fourth transistor M4 is connected to a PI-phase DC bias voltage VG_π via a fourth resistor R4, and the gate of the fourth transistor M4 is also connected to the first input terminal Pin11 via a fourth coupling capacitor CN4; a gate of the fifth transistor M5 is connected to the PI-phase DC bias voltage VG_π via a fifth resistor R5, and the gate of the fifth transistor M5 is also connected to the second input terminal Pin12 via a fifth coupling capacitor CN5; a gate of the sixth transistor M6 is connected to the zero-phase DC bias voltage VG_0 via a sixth resistor R6, and the gate of the sixth transistor M6 is also connected to the second input terminal Pin12 via a sixth coupling capacitor CN6.

Figure 3:
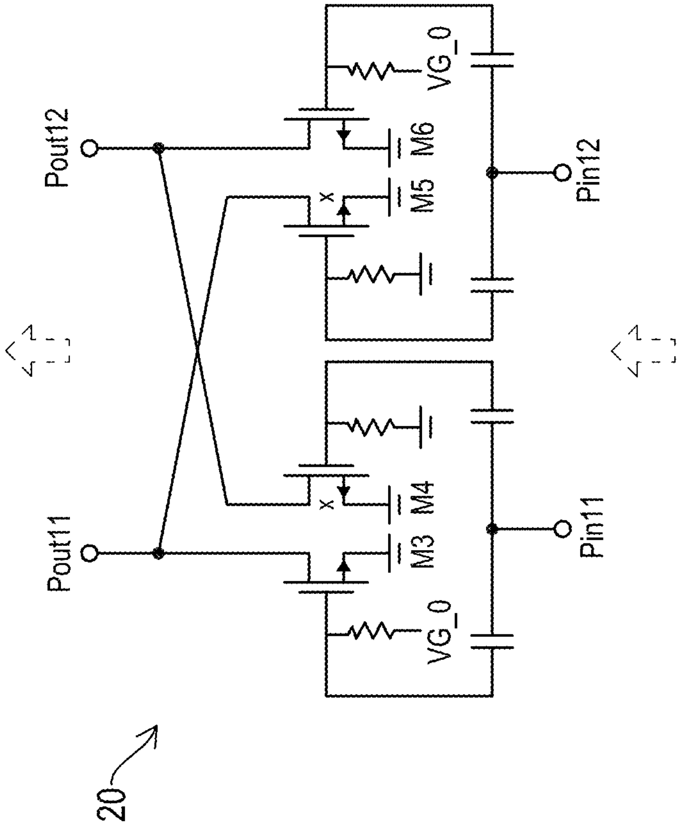
FIG. 3 illustrates a circuit operation schematic diagram of the first binary phase-shift amplifier operated in a zero-phase operation mode of the present invention.

Referring to FIG. 3, FIG. 3 illustrates a circuit operation embodiment of the first binary phase-shift amplifier 20 operated in a zero-phase operation mode, wherein the PI-phase DC bias voltage VG_π is set to ground to turn off the fourth transistor M4 and the fifth transistor M5, and the zero-phase DC bias voltage VG_0 is set to a conductive operation bias voltage to operate the third transistor M3 and the sixth transistor M6 in a conductive operation state so as to amplify a first differential input signal RFin1_diff at the input terminal pair of the first binary phase-shift amplifier 20 via the first binary phase-shift amplifier 20 to output a first differential output signal RFout1_diff at the output terminal pair of the first binary phase-shift amplifier 20.

Figure 4:
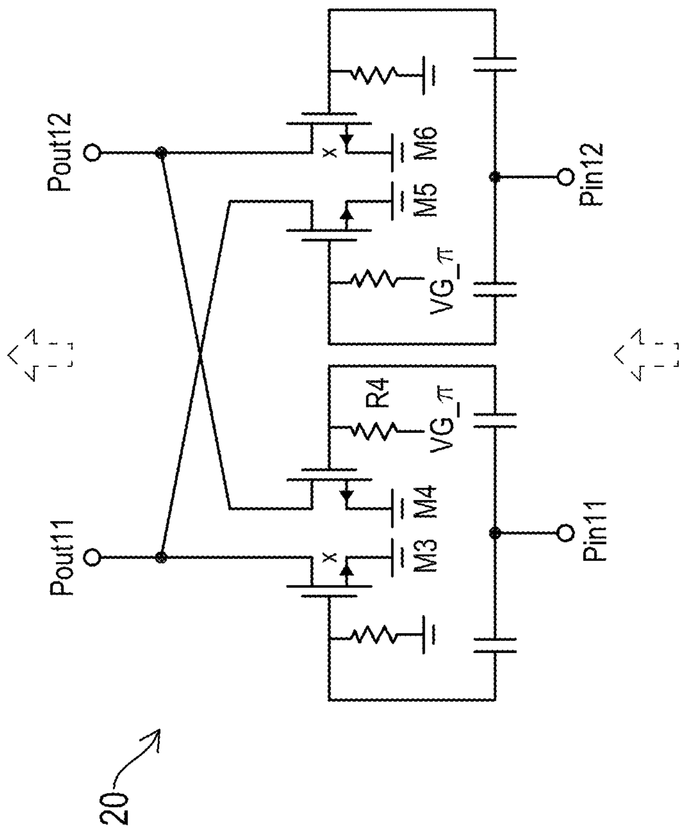
FIG. 4 illustrates a circuit operation schematic diagram of the first binary phase-shift amplifier operated in a PI-phase operation mode of the present invention.

Referring to FIG. 4, FIG. 4 illustrates a circuit operation embodiment of the first binary phase-shift amplifier 20 operated in a PI-phase operation mode, in which the zero-phase DC bias voltage VG_0 is set to ground to turn off the third transistor M3 and the sixth transistor M6, while the PI-phase DC bias voltage VG_π is set to a conductive operation bias voltage to operate the fourth transistor M4 and the fifth transistor M5 in a conductive operation state so as to amplify the first differential input signal RFin1_diff at the input terminal pair of the first binary phase-shift amplifier 20 via the first binary phase-shift amplifier 20 to output the first differential output signal RFout1_diff at the output terminal pair of the first binary phase-shift amplifier 20.

Please refer to FIG. 3 and FIG. 4. It can be seen from FIG. 3 and FIG. 4 that, with respect to the same differential signal input, e.g. the first differential input signal RFin1_diff, there is a phase difference of 180 degrees between the differential output signals of the first binary phase-shift amplifier 20 when operating in the zero-phase operation mode and in the PI-phase operation mode, respectively. It can be seen that by changing the gate voltages of the input transistor group of the first binary phase-shift amplifier 20, i.e. by exchanging the voltage values of the zero-phase DC bias voltage VG_0 and the PI-phase DC bias voltage VG_π, the first binary phase-shift amplifier 20 can consequently perform the binary phase-shift modulation on the differential input signal to produce an differential output signal which is binary phase-shift modulated. Since the circuits of the first binary phase-shift amplifier 20 and the second binary phase-shift amplifier 40 are the same, the circuit operations of the second binary phase-shift amplifier 40 in the zero-phase operation mode and the PI-phase operation mode are the same as the above-mentioned circuit operations of the first binary phase-shift amplifier 20 in the zero-phase operation mode and the PI-phase operation mode. Details of the second binary phase-shift amplifier 40's operations are not repeated here.

Figure 5:
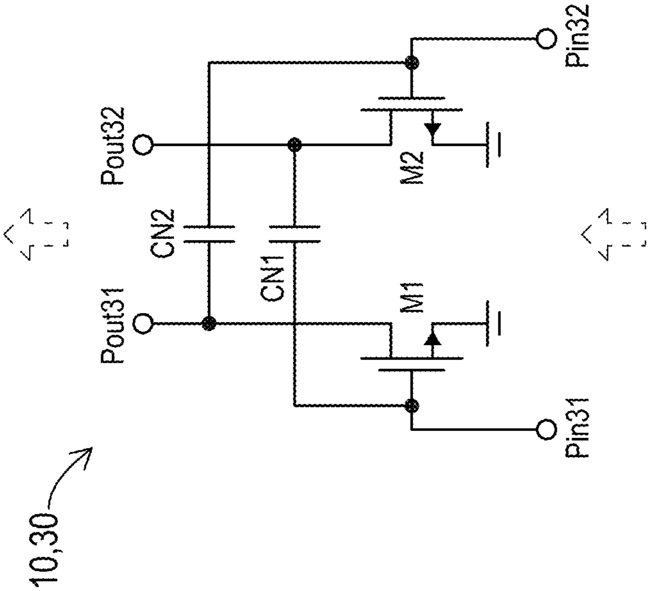
FIG. 5 illustrates a schematic diagram of the circuit of the first power amplifier and the second power amplifier of the present invention.

With reference to FIG. 5, FIG. 5 illustrates a circuit embodiment of the first power amplifier 10 and the second power amplifier 30, wherein the first and second power amplifiers 10, 30 each comprise a pair of input transistors including a first transistor M1 and a second transistor M2, an input terminal pair including a third input terminal Pin31 and a fourth input terminal Pin32, and an output terminal pair including a third output terminal Pout31 and a fourth output terminal Pout32; wherein the sources of the first transistor M1 and the second transistor M2 are both grounded, and a first coupling capacitor CN1 is connected between a gate of the first transistor M1 and a drain of the second transistor M2, a second coupling capacitor CN2 is connected between a gate of the second transistor M2 and the drain of the first transistor M1, the gate of the first transistor M1 is connected to the third input terminal Pin31, the gate of the second transistor M2 is connected to the fourth input terminal Pin32, the drain of the first transistor M1 is connected to the third output terminal Pout32, and the drain of the second transistor M2 is connected to the fourth output terminal Pout32.

Figure 6:
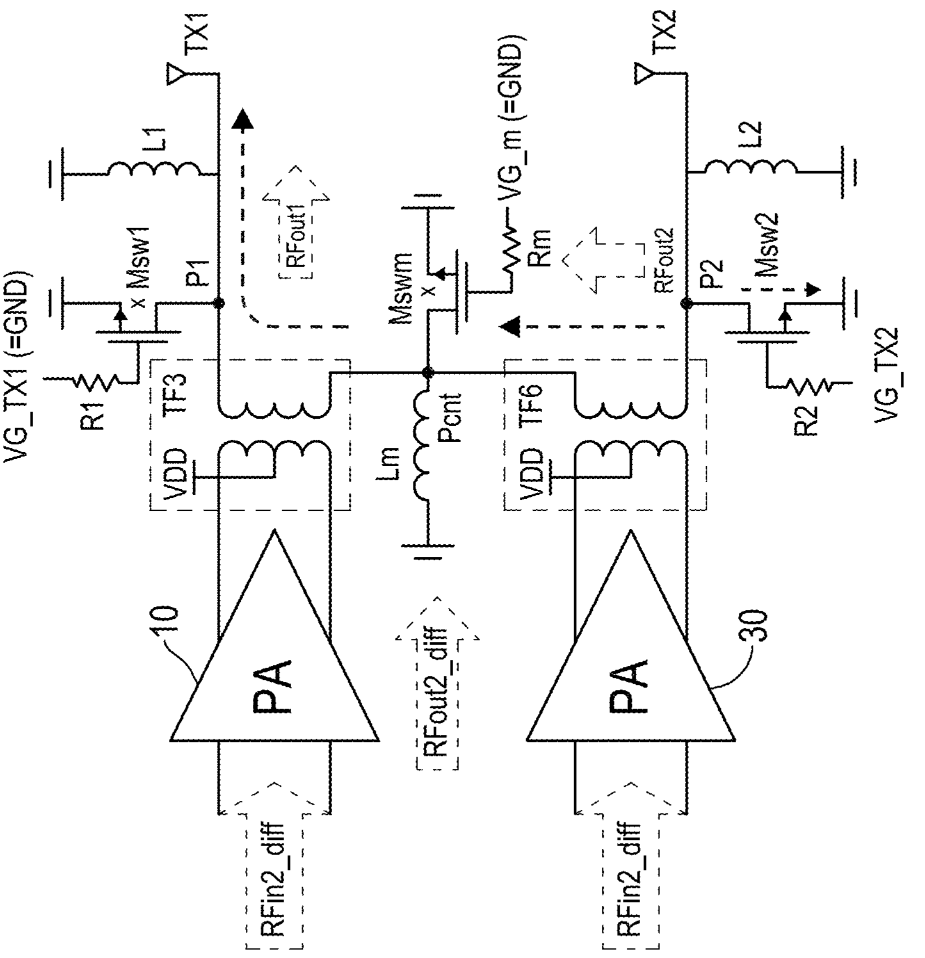
FIG. 6 illustrates a circuit operation schematic diagram of the first single antenna TDM mode of the present invention.

With reference to FIGS. 1 and 6, the input signal source RFin outputs the first differential input signal RFin1_diff to the input terminal pair of the first binary phase-shift amplifier 20 via the low-pass filter 50 and the first coupling inductor TF1, then the first binary phase-shift amplifier 20 outputs the first differential output signal RFout1_diff to the second coupling inductor TF2, and then the second coupling inductor TF2 outputs the second differential input signal RFin2_diff to the input terminal pair of the first power amplifier 10, and then the first power amplifier 10 outputs a second differential output signal RFout2_diff to the third coupling inductor TF3, which then outputs the first output signal RFout1; and at the same time, the input signal source RFin also outputs the first differential input signal RFin1_diff to the input terminal pair of the second binary phase-shift amplifier 40 through the low-pass filter 50 and the fourth coupling inductor TF4, and then the second binary phase-shift amplifier 40 outputs the first differential output signal RFout1_diff to the fifth coupling inductor TF5, and then the fifth coupling inductor TF5 outputs the second differential input signal RFin2_diff to the input terminal pair of the second power amplifier 30, and then the second power amplifier 30 outputs the second differential output signal RFout2_diff to the sixth coupling inductor TF6, which then outputs the second output signal RFout2.

As mentioned above, please refer to FIG. 6 for a circuit operation schematic diagram of a first single antenna TDM mode, wherein the first binary phase-shift amplifier 20 and the second binary phase-shift amplifier 40 are both set to the zero-phase operation mode. The first power amplifier 10 and the second power amplifier 30 each receive the second differential input signal RFin2_diff and output the second differential output signal RFout2_diff to the third coupling inductor TF3 and the sixth coupling inductor TF6, respectively; and then the third coupling inductor TF3 and the sixth coupling inductor TF6 output the first output signal RFout1 and the second output signal RFout2, respectively; wherein the first antenna switching voltage VG_TX1 and the compensation switching voltage VG_m are set to ground voltages to turn off the first switching transistor Msw1 and the third switching transistor Mswm, so that the first switching transistor Msw1 and the third switching transistor Mswm can each be regarded as capacitors with one end grounded, such that the first switching transistor Msw1 is equivalent to an output capacitor and the first inductor L1 is equivalent to an output inductor, so that the first switching transistor Msw1 and the first inductor L1 can be impedance matched to the first antenna TX1; at the same time, the second antenna switching voltage VG_TX2 is set to a high reference voltage, so that the second switching transistor Msw2 can be regarded as a grounded low resistance resistor and the second output terminal P2 of the sixth coupling inductor TF6 can be regarded as a voltage reference point, so that the second switching transistor Msw2 can effectively isolate the second antenna TX2 from the first output signal RFout1 and the second output signal RFout2. In addition, both the compensation inductor Lm and the third switching transistor Mswm which is turned off have a high impedance to prevent the first output signal RFout1 and the second output signal RFout2 from passing through the compensation inductor Lm and the third switching transistor Mswm which is turned off. As the first output signal RFout1 and the second output signal RFout2 are equal in magnitude, in phase, and in series, the input signal of the first antenna TX1 is twice the first output signal (i.e. two times RFout1).

Figure 7:
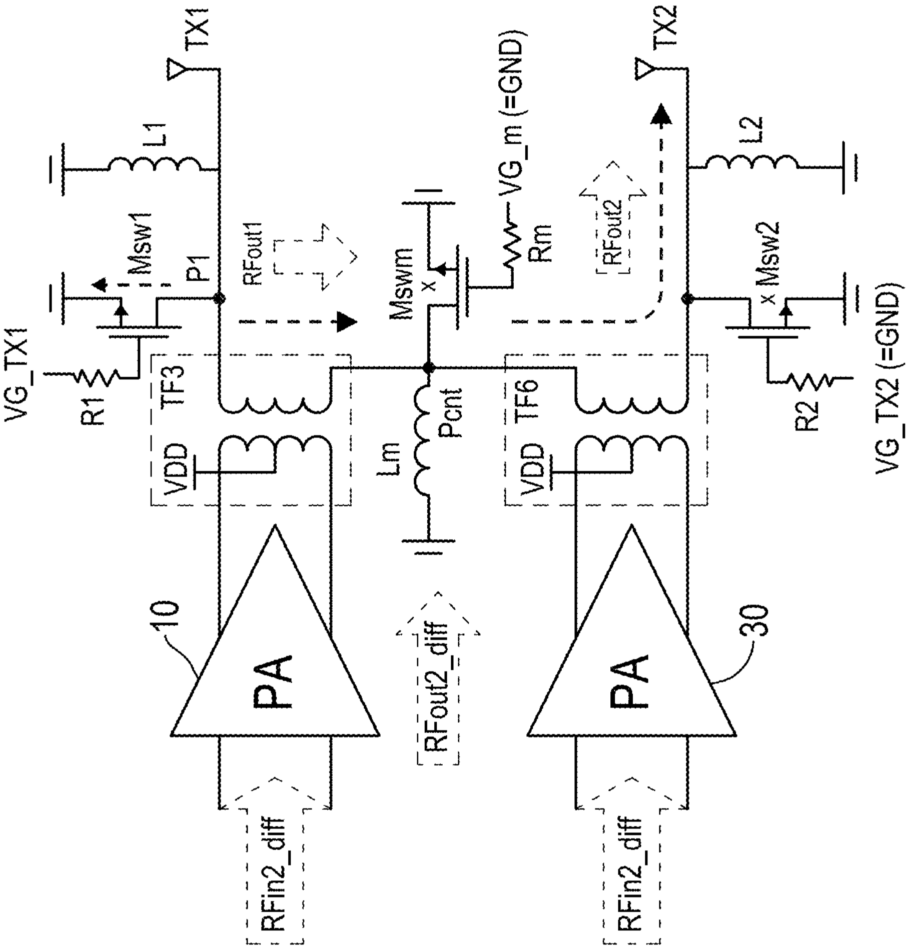
FIG. 7 illustrates a circuit operation schematic diagram of the second single antenna TDM mode of the present invention.

Please refer to FIG. 7 for a circuit operation schematic diagram of a second single antenna TDM mode. The second single antenna TDM mode is more or less the same as the first single antenna TDM mode except that the second antenna switching voltage, VG_TX2, is set as the ground voltage to turn off the second switching transistor Msw2, so that the second switching transistor Msw2 can be regarded as a capacitor with one end grounded, and the second switching transistor Msw2 is equivalent to an output capacitor and the second inductor L2 is equivalent to an output inductor, so that both the second inductor L2 and the second switching transistor Msw2 which are turned off can be impedance matched to the second antenna TX2; at the same time, the first antenna switching voltage VG_TX1 is set to the high reference voltage, so that the first switching transistor Msw1 can be regarded as a grounded low resistance resistor and the first output terminal P1 of the third coupling inductor TF3 can be regarded as a voltage reference point. The first switching transistor Msw1 can effectively isolate the first antenna TX1 from the first output signal RFout1 and the second output signal RFout2, and the input signal of the second antenna TX2 is also twice the first output signal (i.e. two times RFout1).

Figure 8:
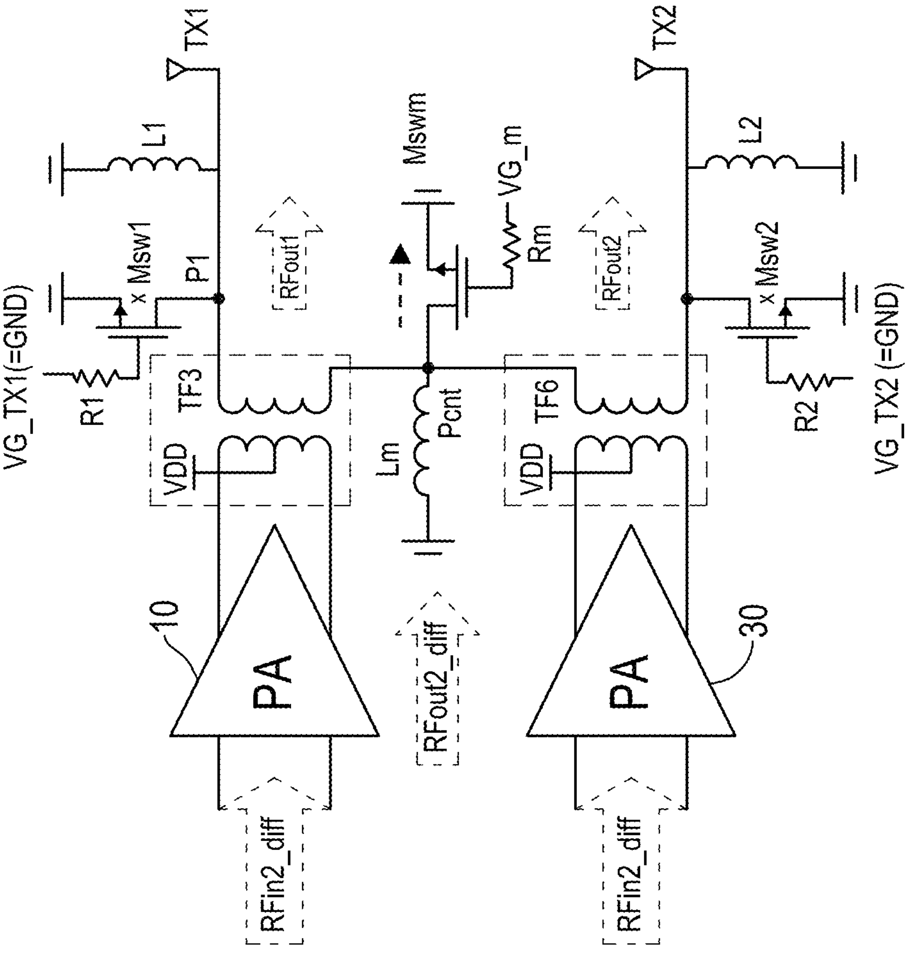
FIG. 8 illustrates a circuit operation schematic diagram of a first two-antenna BPM mode and a second two-antenna BPM mode.

Please refer to FIG. 8 for a circuit operation schematic diagram of a first two-antenna BPM mode and a second two-antenna BPM mode, wherein the first binary phase-shift amplifier 20 and the second binary phase-shift amplifier 40 are both set to the zero-phase operation mode. The first power amplifier 10 and the second power amplifier 30 each receive the second differential input signal RFin2_diff and output the second differential output signal RFout2_diff to the third coupling inductor TF3 and the sixth coupling inductor TF6, respectively; and then the third coupling inductor TF3 and the sixth coupling inductor TF6 output the first output signal RFout1 and the second output signal RFout2, respectively; wherein the first antenna switching voltage VG_TX1 and the second antenna switching voltage VG_TX2 are set to the ground voltage, so that the first switching transistor Msw1 and second switching transistor Msw2 are both turned off, and the first switching transistor Msw1 and the second switching transistor Msw2 can be regarded as grounded capacitors. The first switching transistor Msw1 and the first inductor L1 can be impedance matched to the first antenna TX1, and the second switching transistor Msw2 and the second inductor L2 can be impedance matched to the second antenna TX2; the compensation switching voltage VG_m is set to a high reference voltage, so that the compensation switching transistor Mswm can be regarded as a grounded low-resistance resistor, so that the center terminal Pcnt can effectively isolate the first output signal RFout1 and the second output signal RFout2 from each other; since the first output signal RFout1 and the second output signal RFout2 are equal, in-phase, and both use the center terminal Pcnt as a voltage reference point, the input signal of the second antenna TX2 is negative of the first output signal RFout1, i.e., the input signals of the first antenna TX1 and the second antenna TX2 are equal in magnitude with a 180 degrees (i.e. π) phase difference between them.

As mentioned above, a second two-antenna BPM mode is also disclosed in one embodiment, wherein the second two-antenna BPM mode differs from the first two-antenna BPM mode only in that the first binary phase-shift amplifier 20 and the second binary phase-shift amplifier 40 are both set to the PI-phase operation mode.

It is worth mentioning that any of the above differential signals of the present invention such as the first differential input signal RFin1_diff, the first differential output signal RFout1_diff, the second differential input signal RFin2_diff, and the second differential output signal RFout2_diff, are all perfectly symmetrical waveforms, i.e., the two signals comprising any of the above differential signals are of the same magnitude and the phase difference between the two signals is 180 degrees (i.e., 7*r*).

Figure 9:
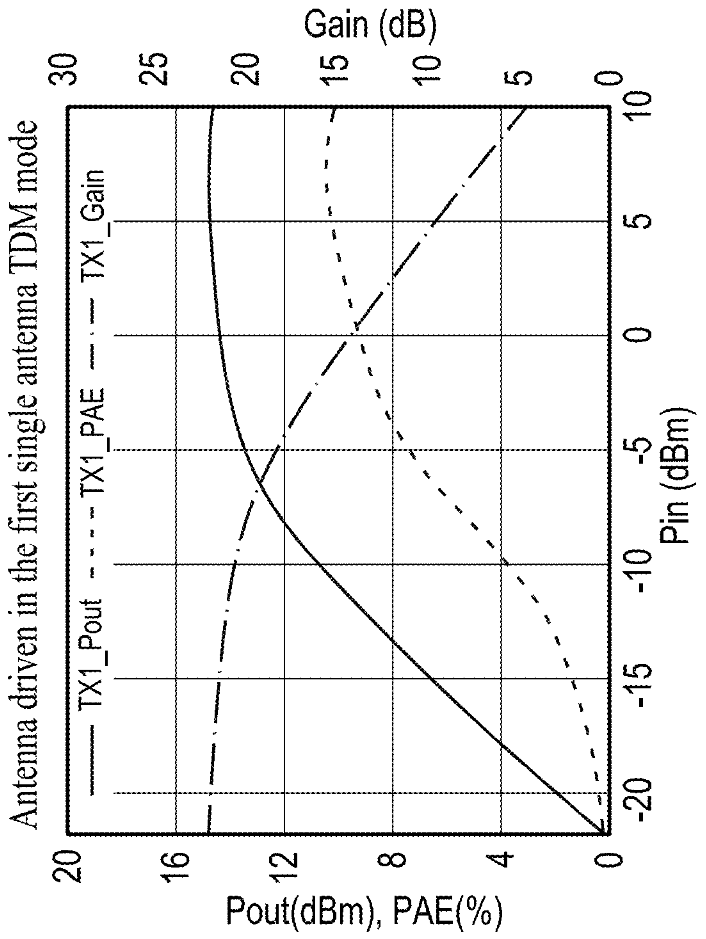
FIG. 9 illustrates the measured value of a first antenna driven in the first single antenna TDM mode and by the two-antenna dual-mode power transmitter of the present invention.
Figure 10:
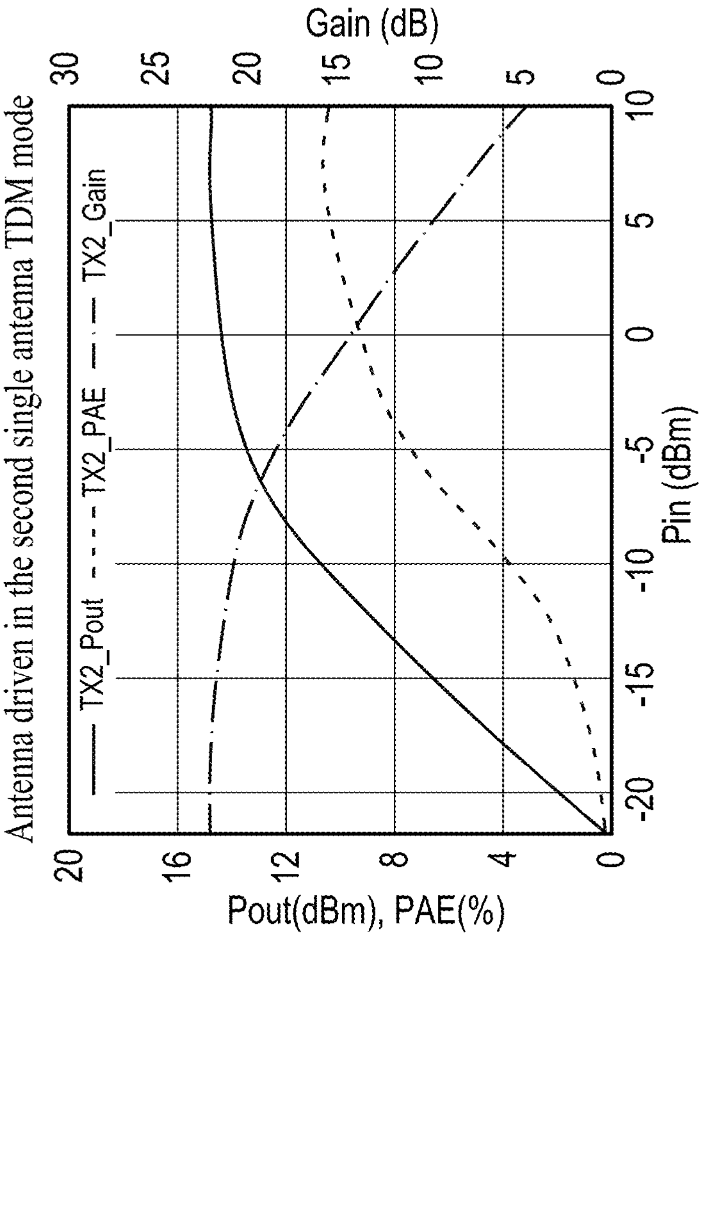
FIG. 10 illustrates the measured value of a second antenna driven in the second single antenna TDM mode and by the two-antenna dual-mode power transmitter of the present invention.

In one embodiment, FIG. 9 shows the measured value of one antenna (i.e. the first antenna TX1) driven in the first single antenna TDM mode and by the two-antenna dual-mode power transmitter of the present invention, and FIG. 10 shows the measured value of one antenna (i.e. the second antenna TX2) driven in the second single antenna TDM mode and by the two-antenna dual-mode power transmitter of the present invention; wherein the label of TX1_Pout refers to the output power of the first antenna TX1, the label of TX1_PAE refers to the power conversion efficiency of the first antenna TX1, and the label of TX1_Gain refers to the gain of the first antenna TX1. The label of TX2_Pout label refers to the output power of the second antenna TX2, the label of TX2_PAE refers to the power conversion efficiency of the second antenna TX2, and the label of TX2_Gain refers to the gain of the second antenna TX2.

Figure 11:
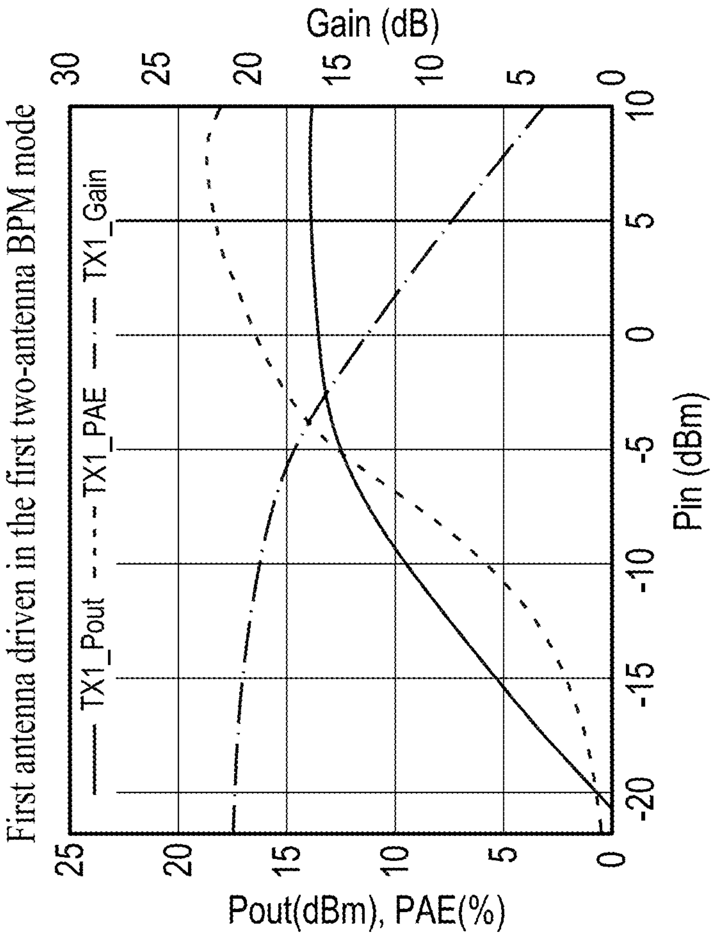
FIG. 11 illustrates the measured value of the first antenna driven in the first two-antenna BPM mode and by the two-antenna dual-mode power transmitter 1 of the present invention.
Figure 12:
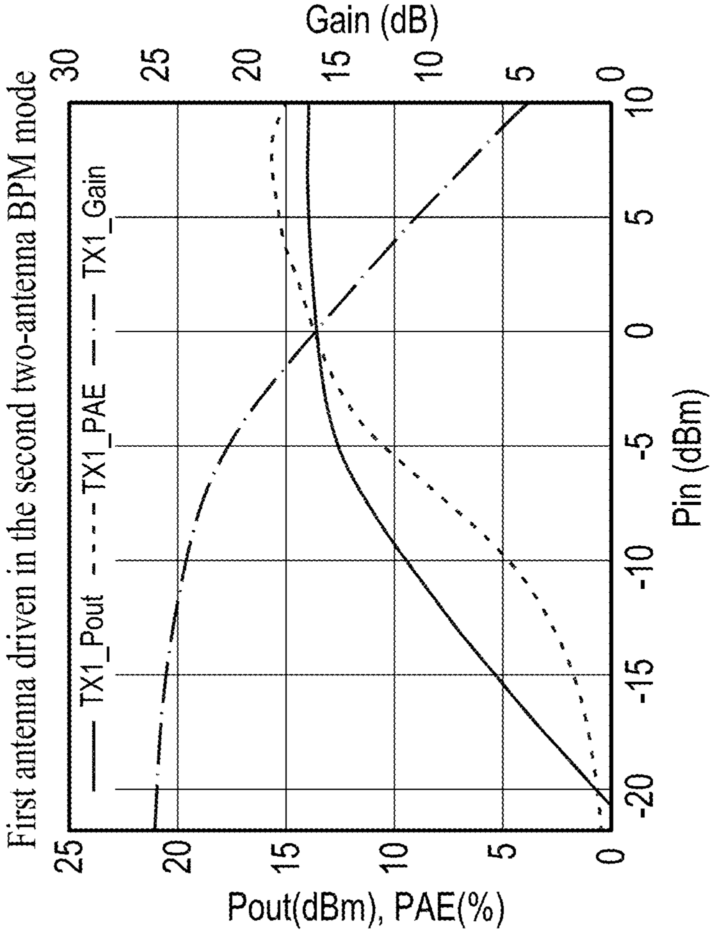
FIG. 12 illustrates the measured value of the first antenna driven in the second two-antenna BPM mode and by the two-antenna dual-mode power transmitter 1 of the present invention.
Figure 13:
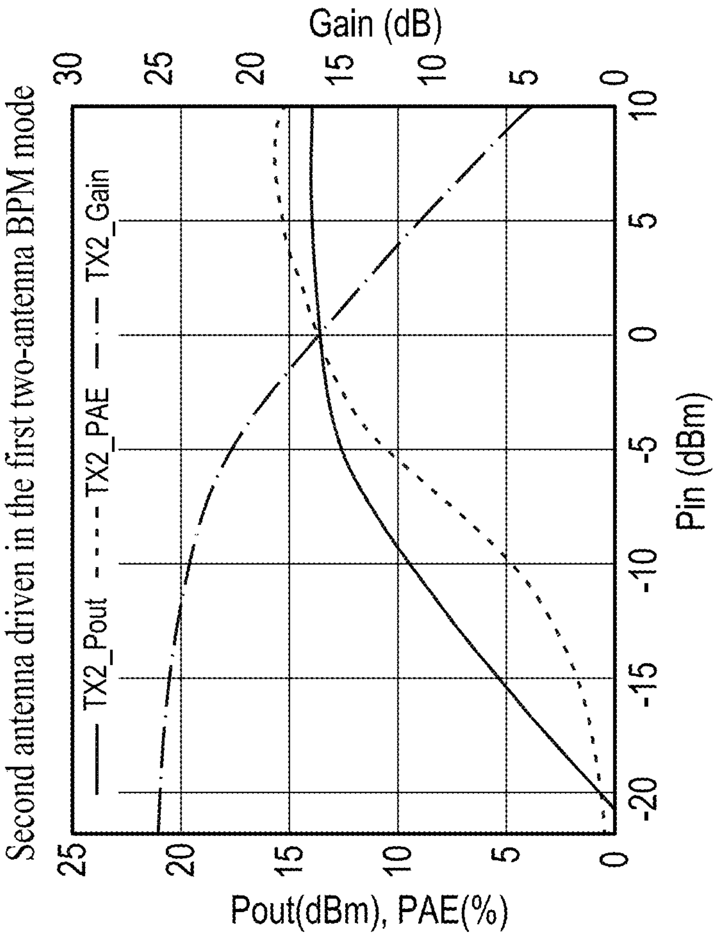
FIG. 13 illustrates the measured value of the second antenna driven in the first two-antenna BPM mode and by the two-antenna dual-mode power transmitter 1 of the present invention.
Figure 14:
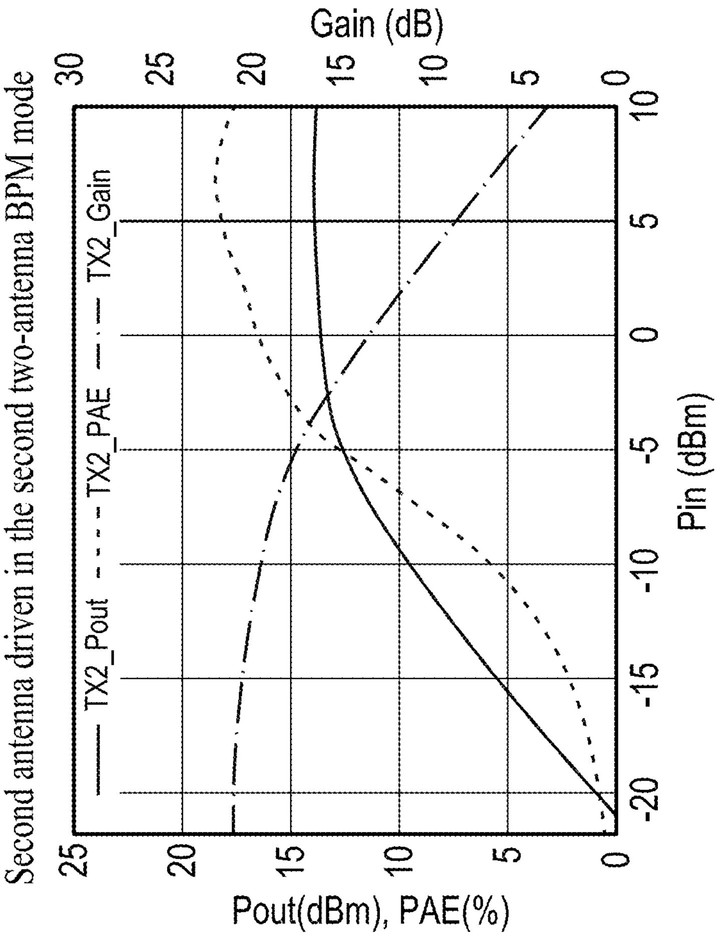
FIG. 14 illustrates the second antenna driven in the second two-antenna BPM mode and by the two-antenna dual-mode power transmitter 1 of the present invention.

In one embodiment, FIG. 11 shows the measured values of the first antenna driven in the first two-antenna BPM mode and by the two-antenna dual-mode power transmitter 1 of the present invention, and FIG. 12 shows the measured values of the first antenna driven in the second two-antenna BPM mode and by the two-antenna dual-mode power transmitter 1 of the present invention. FIG. 13 shows the measured values of the second antenna driven in the first two-antenna BPM mode and by the two-antenna dual-mode power transmitter 1 of the present invention. FIG. 14 shows the measured values of the second antenna driven in the second two-antenna BPM mode and by the two-antenna dual-mode power transmitter 1 of the present invention.

Figure 15:
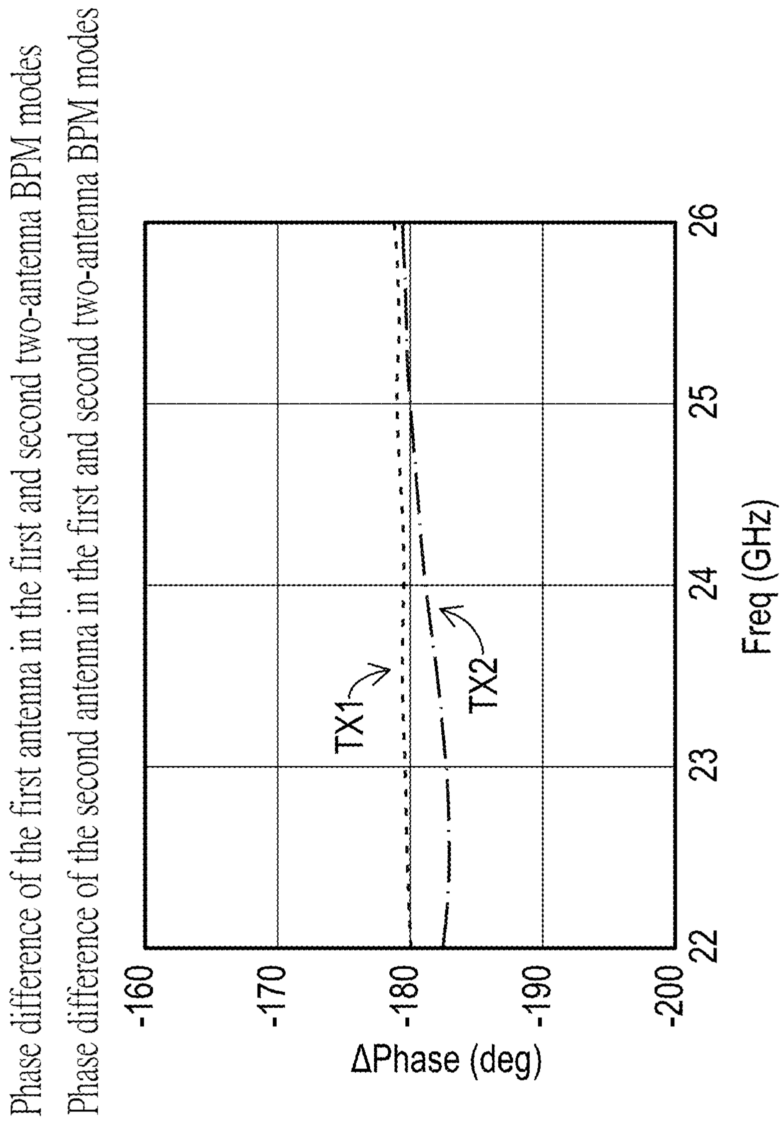
FIG. 15 illustrates the measured value of the phase difference of the first antenna driven respectively in the first and second two-antenna BPM modes and by the two-antenna dual-mode power transmitter of the present invention, and the measured value of the phase difference of the second antenna driven respectively in the first and second two-antenna BPM modes and by the two-antenna dual-mode power transmitter of the present invention.

In one embodiment, FIG. 15 shows the measured value of the phase difference of the first antenna driven respectively in the first and second two-antenna BPM modes and by the two-antenna dual-mode power transmitter of the present invention, and the measured value of the phase difference of the second antenna driven respectively in the first and second two-antenna BPM modes and by the two-antenna dual-mode power transmitter of the present invention.

Figure 16:
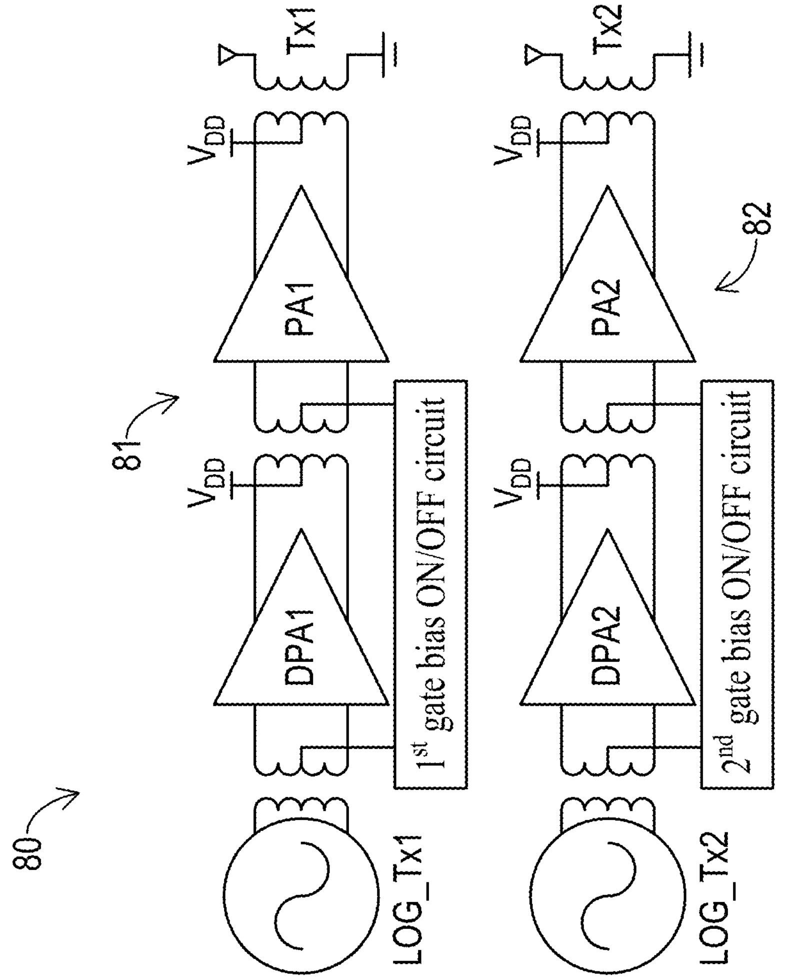
FIG. 16 illustrates a conventional two-antenna time division multiplexing transmitter for MIMO systems.
Figure 17:
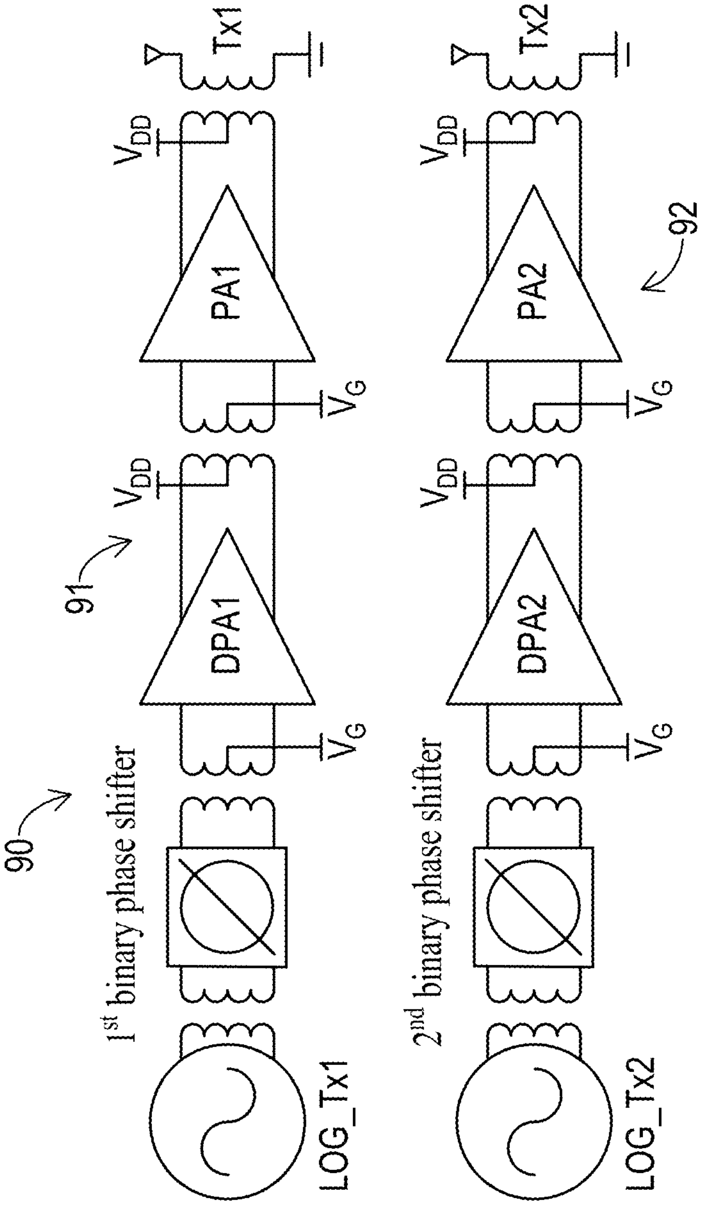
FIG. 17 illustrates a conventional two-antenna binary phase modulation transmitter for MIMO systems.

In one embodiment, Table I compares the efficiency of the circuit of the two-antenna dual-mode power transmitter 1 of the present invention in driving one antenna in the first single-antenna TDM mode, the first two-antenna BPM mode, the conventional TDM mode, and the conventional BPM mode, wherein a power amplifier refers to the first and second power amplifiers 10, 30 of the present invention and the power amplifiers in the conventional two-antenna time division multiplexing transmitter and the conventional two-antenna binary phase modulation transmitter shown in FIGS. 16, 17, and the output power of the power amplifier (POUT_PA) is assumed to be 10 dBm, and the antenna output gains (GT) in the first single antenna TDM mode, the first dual antenna BPM mode, and the conventional TDM mode and BPM mode are assumed to be 3 dBi, and the attenuation of the output matching network 60 (LOSS_OMN) is assumed to be 0 dBi. The total output power (PT) is equal to the output power of the power amplifier (POUT_PA) plus the attenuation of the output matching network 60 (LOSS_OMN), and an equivalent isotropic radiated power (EIRP_TX) is equal to the total output power (PT) plus the antenna output gain (GT).

TABLE I

| | PT (dBm) | GT (dBi) | EIRP_TX (dBm) |
|---|---|---|---|
| conventional TDM mode | 10 | 3 | 13 |
| conventional BPM mode | 10 + 3 | 3 | 16 |
| first single antenna TDM mode | 13 | 3 | 16 |
| first two-antenna BPM mode | 10 + 3 | 3 | 16 |

Although the present invention has been disclosed as above by way of a preferred embodiment, it is not intended to limit the present invention, and any one skilled in the art may make certain changes and modifications without departing from the spirit and scope of the present invention, and therefore the scope of protection of the present invention shall be subject to the scope of the appended patent claims as defined herein.

What is claimed is:

1. A two-antenna dual-mode power transmitter comprising: a first binary phase-shift amplifier having an input terminal pair and an output terminal pair; a first power amplifier having an input terminal pair and an output terminal pair, the output terminal pair of the first binary phase-shift amplifier being electrically connected to the input terminal pair of the first power amplifier; a second binary phase-shift amplifier having an input terminal pair and an output terminal pair; a second power amplifier having an input terminal pair and an output terminal pair, the output terminal pair of the second binary phase-shift amplifier being electrically connected to the input terminal pair of the second power amplifier; an output matching network comprising a third coupling inductor, a sixth coupling inductor, a first switch, a second switch, and a third switch, and the third coupling inductor and the sixth coupling inductor each comprising an input terminal pair, a first output terminal, and a second output terminal, and the first switch, the second switch, and the third switch each comprising a ground terminal, a control terminal, and an output terminal, and the output terminal pair of the first power amplifier connected to the input terminal pair of the third coupling inductor, the output terminal pair of the second power amplifier connected to the input terminal pair of the sixth coupling inductor, the first output terminal of the third coupling inductor connected to the output terminal of the first switch, the second output terminal of the sixth coupling inductor connected to the output terminal of the second switch, and combination of the second output terminal of the third coupling inductor, the first output terminal of the sixth coupling inductor, and the output terminal of the third switch are connected together; wherein circuit structures of the first binary phase-shift amplifier and the second binary phase-shift amplifier are the same, and circuit structures of the first power amplifier and the second power amplifier are the same.

2. The two-antenna dual-mode power transmitter as claimed in claim 1, wherein the output terminal of the first switch is connected to a first antenna, and the output terminal of the second switch is connected to a second antenna.

3. The two-antenna dual-mode power transmitter as claimed in claim 2, wherein operation of the two-antenna dual-mode power transmitter includes a first single antenna time division multiplexing (TDM) mode, in which the first binary phase-shift amplifier and the second binary phase-shift amplifier are both set to a zero-phase operation mode, in which the first switch and the third switch are controlled to be off, and the second switch is controlled to be on, so that the output terminal of the second switch is grounded through the second switch being on.

4. The two-antenna dual-mode power transmitter as claimed in claim 2, wherein operation of the two-antenna dual-mode power transmitter includes a second single antenna time division multiplexing (TDM) mode, in which the first binary phase-shift amplifier and the second binary phase-shift amplifier are both set as a zero-phase operation mode, in which the second switch and the third switch are controlled to be off, and the first switch is controlled to be on, so that the output terminal of the first switch is grounded through the first switch being on.

5. The two-antenna dual-mode power transmitter as claimed in claim 2, wherein operation of the two-antenna dual-mode power transmitter includes a first two-antenna binary phase modulation (BPM) mode, in which the first binary phase-shift amplifier and the second binary phase-shift amplifier are both set as a zero-phase operation mode, in which the first switch and the second switch are controlled to be off, and the third switch is controlled to be on, so that the output of the third switch is grounded through the third switch being on.

6. The two-antenna dual-mode power transmitter as claimed in claim 2, wherein operation of the two-antenna dual-mode power transmitter includes a second two-antenna binary phase modulation (BPM) mode, in which the first binary phase-shift amplifier and the second binary phase-shift amplifier are both set as a PI-phase operation mode, in which the first switch and the second switch are controlled to be off, and the third switch is controlled to be on, so that the output of the third switch is grounded through the third switch being on.

7. The two-antenna dual-mode power transmitter as claimed in claim 1, wherein the first binary phase-shift amplifier comprises: a third transistor, a fourth transistor, a fifth transistor, and a sixth transistor, with the third to sixth transistors each having a source, a gate, and a drain; a third coupling capacitor, a fourth coupling capacitor, a fifth coupling capacitor, and a sixth coupling capacitor, and the third to sixth coupling capacitors each having two ends; the input terminal pair of the first binary phase-shift amplifier comprising a first input terminal and a second input terminal, and the output terminal pair of the first binary phase-shift amplifier comprising a first output terminal and a second output terminal; wherein the sources of the third to the sixth transistors are grounded, the drains of the third transistor and the fifth transistor are connected to the first output terminal, the drains of the fourth transistor and the sixth transistor are connected to the second output terminal; the gate of the third transistor is connected to a zero-phase DC bias voltage via a third resistor, and the gate of the third transistor is also connected to the first input terminal via a third coupling capacitor, and the gate of the fourth transistor is connected to a PI-phase DC bias voltage via a fourth resistor, and the gate of the fourth transistor is also connected to the first input terminal via a fourth coupling capacitor; the gate of the fifth transistor is connected to the PI-phase DC bias voltage via a fifth resistor, and the gate of the fifth transistor is also connected to the second input terminal via a fifth coupling capacitor, and the gate of the sixth transistor is connected to the zero-phase DC bias voltage via a sixth resistor, and the gate of the sixth transistor is also connected to the second input terminal via a sixth coupling capacitor.

8. The two-antenna dual-mode power transmitter as claimed in claim 7, wherein operation of the first binary phase-shift amplifier includes a zero-phase operation mode, the zero-phase operation mode implying that the PI-phase DC bias voltage of the first binary phase-shift amplifier is set to ground to turn off the fourth transistor and the fifth transistor of the first binary phase-shift amplifier, and the zero-phase DC bias voltage is set as a conductive operation bias voltage to operate the third transistor and the sixth transistor in a conductive operation state to transmit a first differential input signal from the input terminal pair of the first binary phase-shift amplifier to the output terminal pair of the first binary phase-shift amplifier via the first binary phase-shift amplifier.

9. The two-antenna dual-mode power transmitter as claimed in claim 7, wherein operation of the first binary phase-shift amplifier includes a PI-phase operation mode, the PI-phase operation mode implying that a zero-phase DC bias voltage of the first binary phase-shift amplifier is set to ground to turn off the third transistor and the sixth transistor of the first binary phase-shift amplifier, and the PI-phase DC bias voltage is set as a conductive operation bias voltage to operate the fourth transistor and the fifth transistor in a conductive operation state to transmit a first differential input signal from the input terminal pair of the first binary phase-shift amplifier to the output terminal pair of the first binary phase-shift amplifier via the first binary phase-shift amplifier.

10. The two-antenna dual-mode power transmitter as claimed in claim 1, wherein the first power amplifier comprises: a first transistor and a second transistor, and the first to second transistors each having a source, a gate, and a drain; a first coupling capacitor and a second coupling capacitor, and the first to second coupling capacitors each having two ends; the input terminal pair of the first power amplifier comprises a third input terminal and a fourth input terminal, and the output terminal pair of the first power amplifier comprising a third output terminal and a fourth output terminal; wherein the sources of the first transistor and the second transistor are grounded, the first coupling capacitor is connected between the gate of the first transistor and the drain of the second transistor, and the second coupling capacitor is connected between the gate of the second transistor and the drain of the first transistor, and the gate of the first transistor is connected to the third input terminal, the gate of the second transistor is connected to the fourth input terminal, the drain of the first transistor is connected to the third output terminal, and the drain of the second transistor is connected to the fourth output terminal.

11. The two-antenna dual-mode power transmitter as claimed in claim 1, wherein operation of the first binary phase-shift amplifier includes a zero-phase operation mode and a PI-phase operation mode, and when the first binary phase-shift amplifier receives the same differential input signal in both the zero-phase operation mode and the PI-phase operation mode, there is a 180-degree phase difference between a differential output signal of the first binary phase-shift amplifier in the zero-phase operation mode and a differential output signal of the first binary phase-shift amplifier in the PI-phase operation mode.

12. The two-antenna dual-mode power transmitter as claimed in claim 1, wherein the output matching network further comprises a first inductor, a second inductor, and a compensation inductor, wherein one end of the first inductor is connected to the output terminal of the first switch, one end of the second inductor is connected to the output terminal of the second switch, one end of the compensation inductor is connected to the output terminal of the third switch, and the other ends of the first inductor, the second inductor, and the compensation inductor are grounded.

13. The two-antenna dual-mode power transmitter as claimed in claim 1, further comprising a low-pass filter, a first coupling inductor, and a fourth coupling inductor, wherein an output terminal of the low-pass filter is connected to both an input terminal of the first coupling inductor and an input terminal of the fourth coupling inductor, and an output terminal pair of the first coupling inductor is connected to the input terminal pair of the first binary phase-shift amplifier, an output terminal pair of the fourth coupling inductor is connected to the input terminal pair of the second binary phase-shift amplifier, the other input terminals of the first coupling inductor and the fourth coupling inductor are grounded, and the circuit structures of the first coupling inductor and the fourth coupling inductor are the same.

14. The two-antenna dual-mode power transmitter as claimed in claim 1, further comprising a second coupling inductor and a fifth coupling inductor, wherein the output terminal pair of the first binary phase-shift amplifier is connected to the input terminal pair of the second coupling inductor, the output terminal pair of the second coupling inductor is connected to the input terminal pair of the first power amplifier; the output terminal pair of the second binary phase-shift amplifier is connected to the input terminal pair of the fifth coupling inductor, the output terminal pair of the fifth coupling inductor is connected to the input terminal pair of the second power amplifier, and circuit structures of the second coupling inductor and the fifth coupling inductor are the same.

15. The two-antenna dual-mode power transmitter as claimed in claim 1, wherein the first switch, the second switch, and the third switch are transistors.

* * * * *